(12) United States Patent
Nica

(10) Patent No.: US 8,998,562 B2
(45) Date of Patent: Apr. 7, 2015

(54) HOLLOW ROTOR CORE FOR GENERATING A VORTEX IN A WIND TURBINE

(76) Inventor: Horia Nica, Laval (CA)

(*) Notice: Subject to any disclaimer, the term of this patent is extended or adjusted under 35 U.S.C. 154(b) by 595 days.

(21) Appl. No.: 13/496,357

(22) PCT Filed: Sep. 16, 2009

(86) PCT No.: PCT/CA2009/001256
§ 371 (c)(1),
(2), (4) Date: Mar. 15, 2012

(87) PCT Pub. No.: WO2011/032249
PCT Pub. Date: Mar. 24, 2011

(65) Prior Publication Data
US 2012/0175883 A1    Jul. 12, 2012

(51) Int. Cl.
*F03D 3/00* (2006.01)
*F03D 1/00* (2006.01)
*F03D 3/06* (2006.01)
*F03D 3/04* (2006.01)
*F03D 1/04* (2006.01)

(52) U.S. Cl.
CPC .............. *F03D 3/0409* (2013.01); *F03D 3/061* (2013.01); *F05B 2240/132* (2013.01); *Y02E 10/721* (2013.01); *Y02E 10/74* (2013.01); *Y10S 415/907* (2013.01)

(58) Field of Classification Search
CPC ........... F03D 3/002; F03D 3/005; F03D 3/04; F03D 3/0409; F03D 3/061; F03D 3/064; F03D 3/065; F05B 2240/33; F05B 2240/34; F05B 2240/2212

USPC .......... 415/4.2–4.5, 907, 908; 416/93 R, 175, 416/176, 177, 179, 181, 182, 189, 203, 416/223 R
See application file for complete search history.

(56) References Cited

U.S. PATENT DOCUMENTS

| | | | |
|---|---|---|---|
| 1,545,633 A * | 7/1925 | Bender | 415/4.4 |
| 1,600,105 A * | 9/1926 | Fonkiewicz | 415/142 |
| 1,783,669 A * | 12/1930 | Oliver | 415/4.5 |
| 4,070,131 A * | 1/1978 | Yen | 415/4.4 |
| 4,236,866 A | 12/1980 | Zapata | |
| 4,309,146 A | 1/1982 | Hein et al. | |
| 4,414,477 A * | 11/1983 | Mewburn-Crook et al. | 290/55 |
| 4,452,562 A * | 6/1984 | Hsu | 415/208.1 |
| 6,800,955 B2 | 10/2004 | McDavid | |

(Continued)

FOREIGN PATENT DOCUMENTS

| | | |
|---|---|---|
| GB | 185939 A | 9/1922 |
| KR | 20080077921 A | 8/2008 |
| WO | 9221878 A1 | 12/1992 |

(Continued)

*Primary Examiner* — Edward Look
*Assistant Examiner* — Jason Davis
(74) *Attorney, Agent, or Firm* — Goudreau Gage Dubuc; Gonzalo Lavin

(57) ABSTRACT

A hollow rotor core assembly for a wind turbine with at least one set of cylindrical stacks having a plurality of guiding vanes on the internal surface of the cylindrical stacks, having at least one set of air openings to accept airflow into the hollow rotor core for creating when in rotation a vortex inside the hollow rotor core, having at one end a partial blocking device as such to allow the exhaust of only a fraction of the peripheral portion of the vortex and to redirect the remaining central portion of the vortex towards the other end of the hollow rotor core where the bulk of the airflow will be exhausted from the hollow rotor core.

19 Claims, 5 Drawing Sheets

(56) References Cited

U.S. PATENT DOCUMENTS

| | | | |
|---|---|---|---|
| 7,086,823 B2 * | 8/2006 | Michaud | 415/4.2 |
| 2004/0183310 A1 * | 9/2004 | Mowll | 290/55 |
| 2010/0196150 A1 * | 8/2010 | Nica | 415/191 |

FOREIGN PATENT DOCUMENTS

| | | | | |
|---|---|---|---|---|
| WO | WO 03025395 A1 * | 3/2003 | | |
| WO | WO 2006119648 A1 * | 11/2006 | | |
| WO | WO 2009006721 A1 * | 1/2009 | | F03D 3/00 |

* cited by examiner

HOLLOW ROTOR CORE FOR GENERATING A VORTEX IN A WIND TURBINE

CROSS-REFERENCE TO RELATED APPLICATIONS

This application is a National Entry Application of PCT application no PCT/CA2009/001256 filed on Sep. 16, 2009 and published in English under PCT Article 21(2). All documents above are incorporated herein in their entirety by reference.

FIELD OF THE INVENTION

The present invention relates to wind turbines used to convert wind energy into mechanical energy, more specifically to wind turbines that use the phenomenon of vortex creation to extract the wind energy.

BACKGROUND OF THE INVENTION

Wind as a source of energy is a concept that has been promoted from ancient time. According to historical sources, there is evidence which shows that windmills were in use in Babylon and in China as early as 2000 B.C.

Wind is used as a source of energy for driving horizontal axis and vertical axis windmills. Horizontal axis windmills have been used extensively to drive electrical generators, however they suffer from several disadvantages, including the need for a laminar (non-turbulent) horizontal air inflow, danger to birds and air traffic, obscuring the landscape with banks of rotating windmills, and in the case of large diameter horizontal axis propellers, supersonic speeds at the tips of the rotors.

Vertical axis wind turbines (VAWT) seams to suffer less from the disadvantages of the horizontal axis wind turbines; however so far the VAWT are not often used in commercial applications.

Usually the current wind turbine technologies extract the wind energy via their blades using lift or drag to turn their rotor. Very few of prior art wind turbine technologies are using the vortex to extract the wind power energy. Those that use the vortex are doing it mainly as a way to rapidly exhaust the airflow from the wind turbine rather than as a significant increase in wind power extraction.

An example of vertical axis wind turbine (VAWT) using the vortex to exhaust the airflow is shown in British Patent No. 185,939 to Hashimoto et al. that discloses a vertical axis wind turbine where the airflow creates a natural vortex in the center of the rotor and it is exhausted via an exhaust chamber system situated on top of the turbine. The novelty of the Hashimoto invention is a cowl-like casing that creates opposite flows to force the air to be exhausted as soon as possible towards the centre of the turbine and via the exhaust chamber. In the Hashimoto design the functioning objective is to have the airflow exhausted as soon as possible after it passed the rotor blades. Any airflow that escapes to the other chambers of the rotor, instead of being directly exhausted, will contribute negatively to the overall efficiency of the turbine. One of the major drawbacks of that design is the fact that the turbine has a very complex exhaust chamber connected rigidly to the cowl-like casing that has to rotate according to the wind direction. Moreover the Hashimoto design does not have any means to extract more energy from the naturally created vortex, using that vortex only as a way to rapidly exhaust the airflow.

U.S. Pat. No. 1,545,633 to A. Bender discloses another vertical axis wind turbine having two sets of blades one on top of the other, as such that the upper series of blades act as a deflector to exhaust the airflow towards a central exhaust cylinder (stack) having inside that stack a third propeller intended to extract more energy from the exhausted airflow. The Bender's VAWT has a central cylindrical hollow core closed in the bottom by a circular flange. One of the major drawbacks of that design is the fact that the vortex created in the upper dome can escape only via the upper exhaust stack having inside the third propeller. That third propeller is covering the whole sectional surface of the exhaust cylinder creating a pressure to the exhaust of the airflow. The pressure created by the third propeller is naturally regulated, due to the free flow dynamics of the wind, by having at the exterior less wind going towards the turbine and having more wind going around the turbine, which translates in lower efficiency of the disclosed design.

U.S. Pat. No. 4,452,562 to Cheng-Ting Hsu discloses a tornado type wind turbine that uses the vortex generated in a collecting tower. The collecting tower as well as the lower intake chamber needs to face the wind, so it requires a yaw mechanism to orient it into the wind.

Further, U.S. Pat. No. 4,070,131 to James Yen discloses an outer tornado type turbine that has a stationary structure in which a vortex is created. The stationary structure has vertical stationary vanes that allow the airflow to enter in the center of the structure in a generally circular path to allow the creation of the vortex. One of the major drawbacks of that design is that, being in a free flow dynamics system such as the natural wind conditions, it requires a considerable size of such a turbine to be able to create a vortex that will drive an electrical generator.

International Patent Application No. PCT/CA01/01310 (Louis Michaud) discloses an induced vortex turbine where the vortex is created by artificially heating the air within the circular tower and mixing it with warmer airflows.

Further, U.S. Pat. No. 1,600,105 to Fonkiewicz discloses another induced vortex turbine where the vortex is created by artificially heating the air at the base of a relatively large circular tower made of concrete, cement blocks or bricks.

U.S. Pat. No. 1,783,669 (Oliver) discloses a horizontal axis system turbine in an air augmenter tubular body where a plurality of propellers is installed to extract the wind energy. It is assumed that the airflow will create a vortex inside the tubular body due to the rotation of the propellers. The design has many shortcomings due to impracticality of turning the whole structure to face the wind. Moreover the design do not allow for a proper creation of a vortex. Inside the tubular body the close installation of the propellers creates a highly turbulent airflow rather than a proper vortex.

U.S. Patent Application No. 2004/0183310 (Mowll) discloses another concept of horizontal axis wind turbine comprising an airflow augmenter defined in the patent application as vortex housing. One of the major drawbacks of that design is the fact that the vortex housing needs to face the wind, so it requires a yaw mechanism to orient it into the wind. Moreover, the vortex housing is only an augmenter to take the airflow on a larger surface to direct it towards a smaller surface where the propeller is installed. In that design the vortex is created only behind the propeller, in the small exhaust channel where there are no other wind energy extraction means.

U.S. Pat. No. 4,414,477 to Mewburn-Crook discloses a drag type of vertical axis wind turbine with stator vanes and having helical stator fins on the tower bellow the turbine to create an upward pushing airflow to facilitate the exhaust of the wind from the wind turbine. The intent of the design with the helical stator fins on the tower is to create an upwardly vortex that will assist the rotation of the upper turbine. The shortcoming of this design is that no proper vortex is created in that configuration as the turbine fans extends radially to the central shaft not creating any type of central whole where the vortex might have been created. The upwardly helical airflow, intended to be guided by the stator fins, encounters the rotational turbine blades as well as the turbulences created by the rotation of the upper turbine fan and any desired vortex is annihilated.

International Patent Application No. PCT/CA2006/000803 to Arrowind discloses a Savonious type of vertical axis wind turbine where the blades define an open area in the center of the rotor section to create a vertical vortex air. Regarding the intended vortex, the shortcoming of that design is the fact that there are no means to control and maintain the vortex or extract any significant energy from it.

International Patent Application No. PCT/CA2007/001200 attributed to the applicant discloses a boundary layer wind turbine having openings near the center of the disks to create a vortex intended to contribute to increase the rotation of the turbine and as a consequence its efficiency. Regarding the created vortex, the shortcoming of that design is the fact that there are no means to control the vortex or significantly extract its energy.

A disadvantage of all the horizontal and vertical axis windmills of the prior art mentioning vortex phenomenon relates to their inability to control and maintain the vortex or extract its energy beyond the kinetic energy of the rotating airflow. Unfortunately, in most cases the prior art do not takes into consideration all the complex aspects of the vortex phenomenon.

There is therefore a need for a wind turbine that uses the vortex properties and is able to extract its energy beyond the kinetic energy of the rotating airflow, taking into consideration all the complex aspects of the vortex phenomenon in free fluid dynamics conditions.

OBJECTS OF THE INVENTION

It is a preferred object of the present invention to provide a method to create, and maintain a vortex in a vertical axis wind turbine.

It is a further preferred object of the invention to provide a method to separate the vortex airflow into two distinct currents of different temperatures where the bulk of the airflow entering in the wind turbine exits at a lower temperature.

SUMMARY OF THE INVENTION

According to the present invention, there is provided a hollow rotor core assembly for a wind turbine, comprising:
 a hollow rotor core having a first end and a second end, the hollow rotor core comprising at least one set of cylindrical stacks, each cylindrical stack having a plurality of guiding vanes on an internal surface thereof;
 a plurality of air openings formed on the cylindrical stacks and adapted to accept an airflow into the hollow rotor core for creating a vortex inside the hollow rotor core upon rotation of the rotor assembly, wherein the plurality of guiding vanes maintain the vortex within the hollow rotor core; and
 an airflow blocking device mounted to the first end of the hollow core, the blocking device allowing an exhaust of a fraction of a peripheral portion of the vortex through the first end of the hollow rotor core and redirecting a remaining central portion of the vortex towards the second end of the hollow rotor core for exhaustion of the remaining central portion of the vortex from the hollow core through the second end.

Preferably, the airflow is redirected by the wind turbine so as to enter in the hollow rotor core tangentially or in close vicinity to the peripheral internal surface of the hollow rotor core.

The airflow entering into the rotating hollow rotor core creates a vortex due to its previous rotational movement. Moreover the vortex is maintained inside the hollow rotor core due to the helical guiding vanes on the internal surface of the cylindrical stacks.

In addition to maintaining the vortex, the helical guiding vanes on the internal surface of the cylindrical stacks also contribute to the extraction of a significant portion of the vortex energy which increases the efficiency of the wind turbine.

Preferably, the airflow blocking device has a spherical shape with a concave central deflector. Preferably, the blocking device rotates synchronously with a rotor of the wind turbine.

Preferably, at the second end, the hollow rotor core has a conical rotating device having helical threads to boost the rapid exhaust of the central portion of the vortex through the second end. Preferably, the threaded cone rotates faster than the wind turbine via a gearing device connecting the rotor of the wind turbine to the threaded cone. In the preferred embodiment, the threaded cone rotates between 1.5 and 2 times faster than the rotor of the wind turbine.

In the vortex dynamics, the fluid at the periphery has higher temperature than the fluid at the center. The design of the wind turbine assembly with two different devices, one at each end of the hollow rotor core, allows the separation of the vortex airflow into two distinct currents of different temperatures where the bulk of the airflow entering the wind turbine hollow rotor core exits at a lower temperature.

The fact that the bulk of the airflow exits at a lower temperature means that a portion of the thermal energy of the airflow is transferred into kinetic energy of the wind turbine, consequently contributing to an increase in the efficiency of the wind turbine.

Although the hollow rotor core may be equipped with any number of cylindrical stacks and any number of air openings, in a preferred embodiment all the cylindrical stacks cover at least $\frac{1}{3}^{rd}$ of the hollow rotor core height.

In a preferred embodiment, the hollow rotor core is designed in conjunction with the boundary layer wind turbine as disclosed in the International Patent Application No. PCT/CA2007/001200 attributed to the applicant.

Preferably, the wind turbine acts to convert wind currents into mechanical energy used to directly act upon a water pump, or to drive an electrical generator for use as an alternate power source.

The invention as well as its numerous advantages will be better understood by reading the following non-restrictive description of preferred embodiments made in reference to the appending drawings.

DETAILED DESCRIPTION OF THE INVENTION

Figure 1:
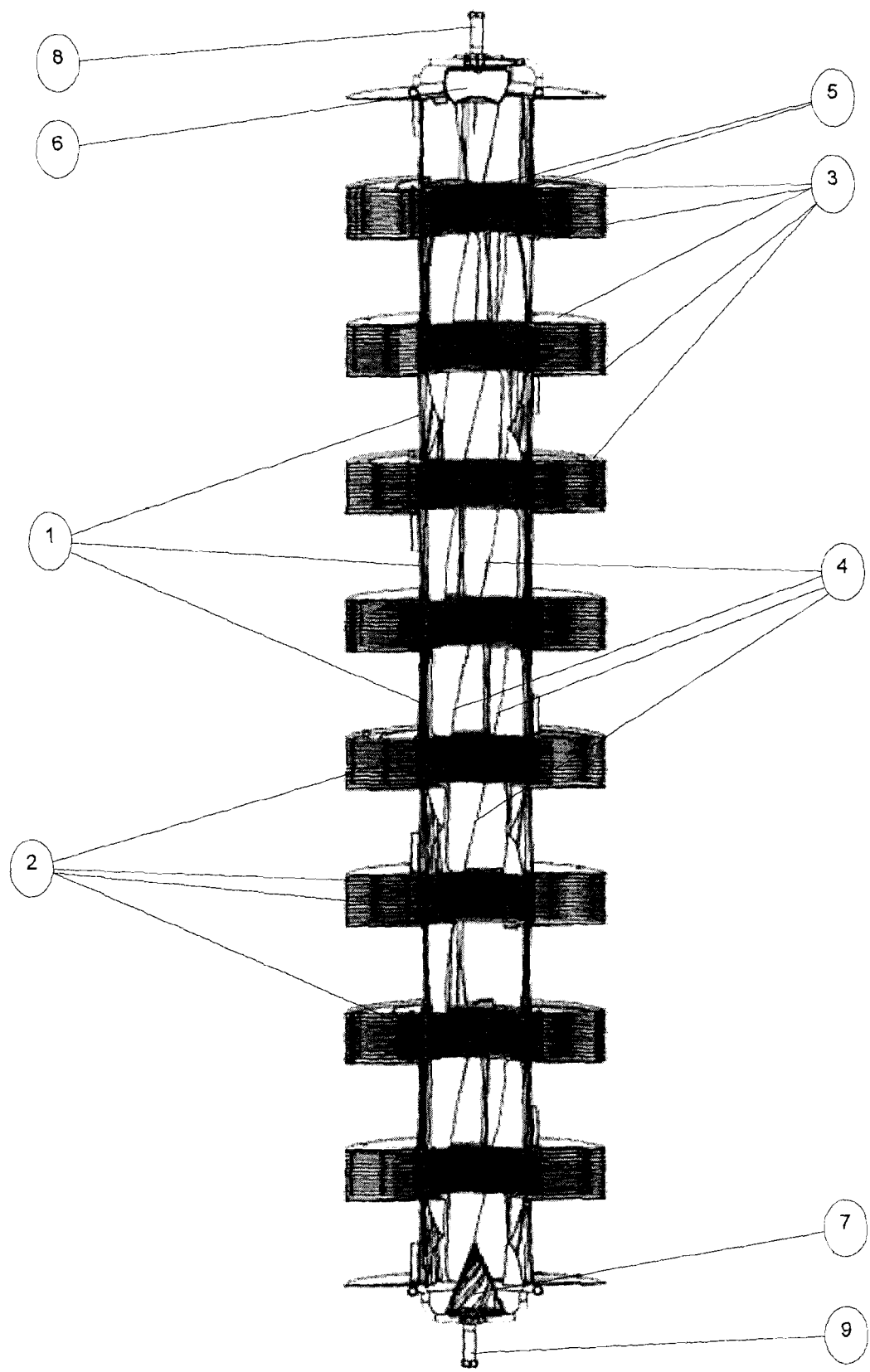
FIG. 1 is a sectional view of the hollow rotor core, where the cylindrical stacks, the air openings, the end sphere and end threaded cone are visible, according to a preferred embodiment of the present invention.

FIG. 1 illustrates a hollow rotor core assembly for a wind turbine, showing in this preferred embodiment a plurality of cylindrical stacks 1 having between them a plurality of disks 3 that are closely spaced where the airgap between the disks 3 creates the air openings 2 that allow the airflow to enter in the hollow rotor core. As mentioned above, the hollow rotor core is preferably designed in conjunction with the boundary layer wind turbine, which is disclosed in the International Patent Application No. PCT/CA2007/001200 attributed to the applicant. In such design, the plurality of closely spaced disks increases the efficiency of the wind turbine. It will be therefore apparent to a person skilled in the art that the use of the disks is optional.

The cylindrical stacks 1 have on their internal surface a plurality of helical guiding vanes 4 that, in use, help maintain an airflow vortex inside the hollow rotor core. The size and shape of the hollow opening of the central stack 1 and of the guiding vanes 4 are determined according to the particular parameters of the wind turbine as persons skilled in the art will understand.

The disks 3 have a hollow central opening with a plurality of teeth 5 that match the shape of the guiding vanes 4.

Due to the use of the disks 3 in this embodiment, the airflow will create a boundary layer on the surface of the disks 3 and will enter in the hollow rotor core tangentially or in close vicinity to the peripheral internal surface of the hollow rotor core. The airflow entering into the rotating hollow rotor core will create a vortex due to its previous rotational movement.

The assembly of the cylindrical stacks 1 and of the disks 3 is made as such that the guiding vanes 4 in conjunction with the teeth 5 create a plurality of helical blades on the internal surface of the hollow core that will help maintaining an airflow vortex inside the hollow rotor core. Moreover, these internal helical blades will help to the extraction of the vortex energy and will contribute to increase the power imparted to a rotor of a wind turbine.

In this embodiment in vertical position, the top of the hollow core is partially blocked by an airflow blocking device, such as a sphere 6 which will allow the exhaust of only a fraction of the peripheral portion of the vortex. The dimensions of the sphere 6 are such that, when assembled on the hollow core, the sphere surface will practically touch or it will be in very close vicinity with the edge of the guiding vane 4. The sphere 6 is rigidly attached to a top shaft frame 8 which is attached to the top structure of the hollow core. The sphere 6 rotates synchronously with the hollow rotor core and consequently with the rotor of wind turbine.

The bottom of the hollow rotor core has a conical rotating device such as a cone 7 having helical threads to boost the rapid exhaust of the central portion of the vortex. The cone 7 is attached to a bottom shaft frame 9 which is attached to the bottom structure of the hollow core. In the preferred embodiment, the cone 7 rotates faster than the wind turbine (not shown) via a gearing device (not shown) attached to the bottom shaft frame 9. In the preferred embodiment the threaded cone rotates between 1.5 and 2 times faster than the turbine rotor (not shown).

In the vortex dynamics, the fluid at the periphery has higher temperature than the fluid at the center. The design with the sphere 6 and the threaded cone 7 at each end of the hollow rotor core allows the separation of the vortex airflow into two distinct currents of different temperatures where the bulk of the airflow entering in the wind turbine hollow core exits at a lower temperature.

The fact that the bulk of the airflow exits at a lower temperature means that a portion of the thermal energy of the airflow is transferred in kinetic energy via the internal blades created by the guiding vanes 4 and the disks' teeth 5, contributing to increase the efficiency of the wind turbine.

Figure 2:
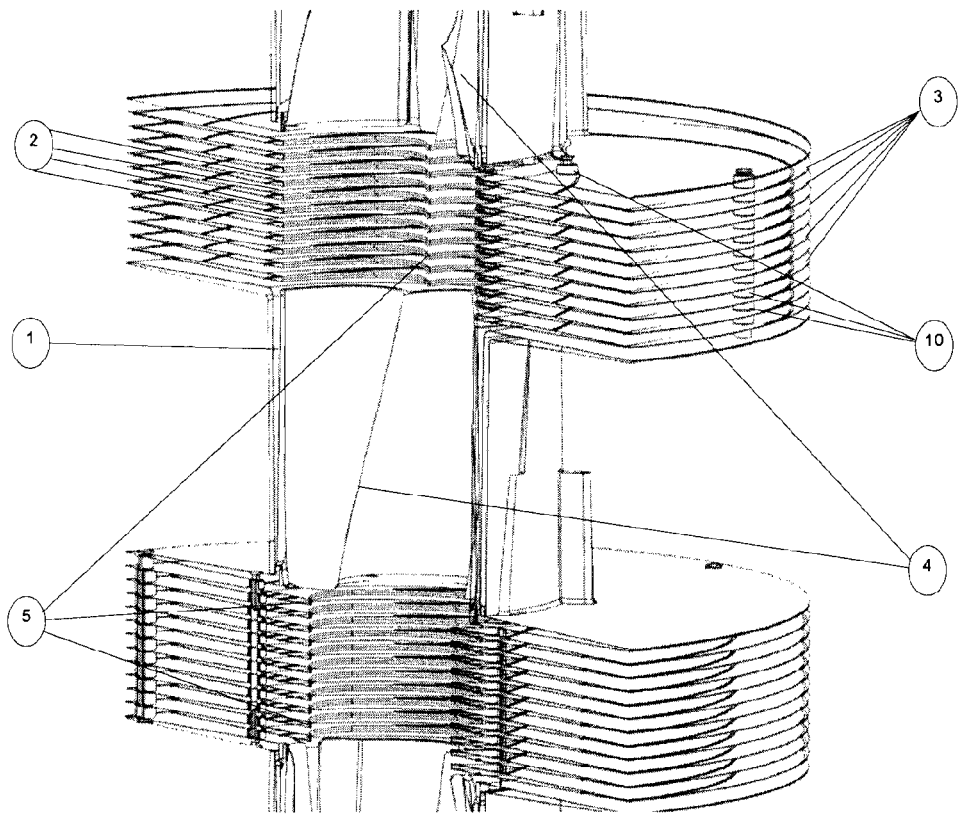
FIG. 2 is a detailed view a series of cylindrical stacks with the helical guiding vanes on the internal surface of the cylindrical stack as presented in the sectional view in FIG. 1.

FIG. 2 is a detailed view from FIG. 1, presenting the detail of the cylindrical stack 1 with the helical guiding vanes 4 on the internal surface of the cylindrical stack 1. The disks 3 are closely spaced creating the air openings 2 that allow the airflow to enter into the hollow rotor core. The disks 3 have teeth 5 that create with the guiding vanes 4 an internal helical blade. As shown in FIG. 1, the disks 3 are assembled one on top of the other with pins 10 that maintain the required distance between the disks.

Figure 3:
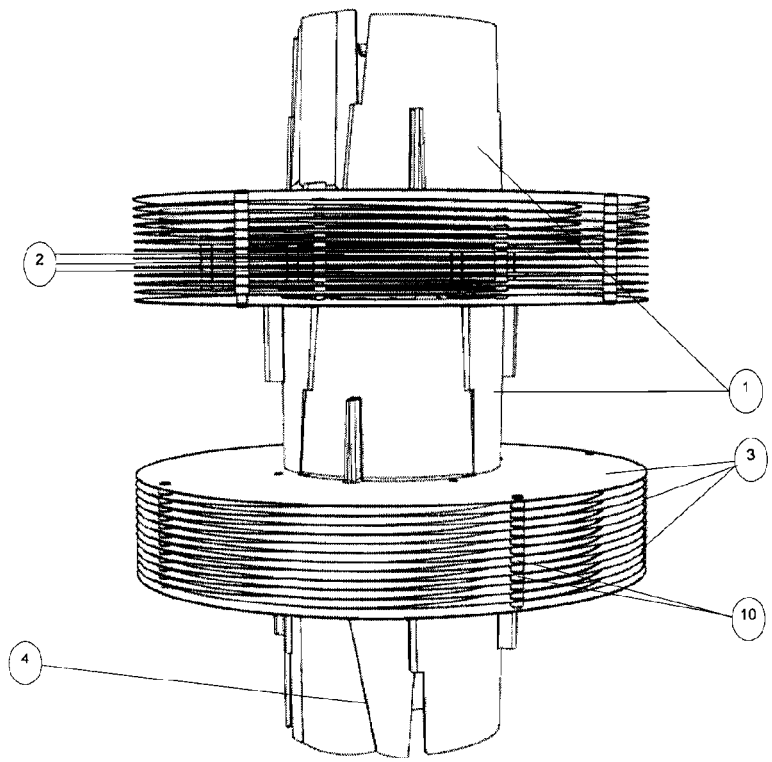
FIG. 3 is a detailed view of the hollow rotor core (unsectioned), where the disks define the air openings to accept the airflow into the hollow rotor core, according to a preferred embodiment of the present invention.

FIG. 3 is a detailed view of the hollow rotor core (unsectioned), presenting the cylindrical stacks 1 and the disks 3 that define the air openings 2 to accept the airflow into the hollow rotor core. From a manufacturing and assembly point of view, the cylindrical stacks 1 are made such as to assemble one into the other with interlocking devices (not shown). The un-assembled bottom stack leaves visible the external shape of the guiding vane 4. The disks 3 are assembled one on top of the other with the pins 10 that keep the required distance between the disks. In the preferred embodiment of the invention, the proportion between the height of the cylindrical stacks 1 and the height of the assembled disks 3 between two cylindrical stacks 1, will be anywhere between 1:2 and 2:1.

Figure 4:
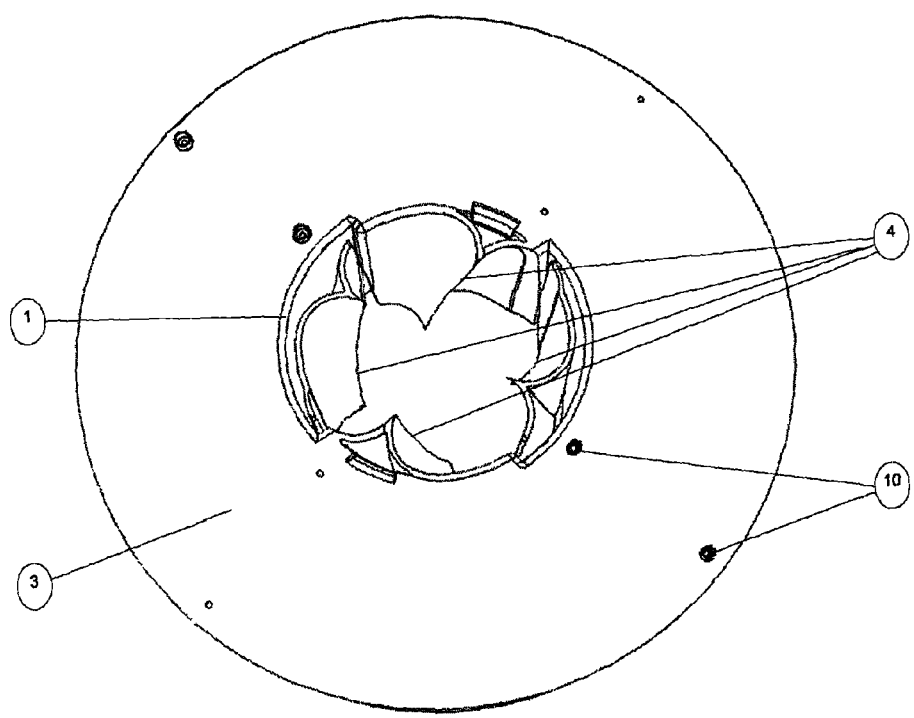
FIG. 4 is a top view of a cylindrical stack with the helical guiding vanes on its internal surface.

FIG. 4 is a top view of a cylindrical stack 1 with the helical guiding vanes 4 on its internal surface. In this preferred embodiment there are four helical guiding vanes 4 each with an edge tilted from top right to bottom left. This disposition of the helical edge takes into consideration the fact that the exhaust is at the bottom and the turbine rotor turns anti-clockwise and accordingly the vortex created in the hollow rotor core turns anti-clockwise. It will be understood that if the turbine is to be driven in a clockwise direction and keeping the exhaust at the bottom, the orientation of the helical guiding vanes 4 may be reversed such that the helical guiding vanes 4 will have their edge tilted from top left to bottom right. For structural reasons of the whole hollow rotor core, the cylindrical stack 1 is rigidly fixed to the closest disk 3 in the disks assembly. Again, has shown in FIGS. 1 to 3, the disks 3 are assembled one on top of the other with the pins 10 that keep the required distance between the disks.

Figure 5:
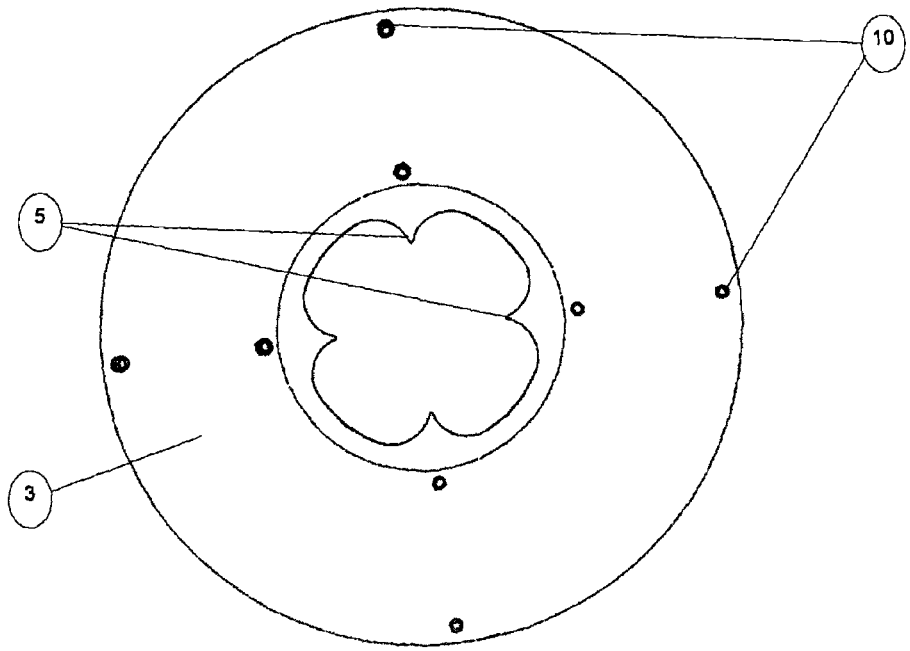
FIG. 5 is a top view of a disk with the central opening to define the teeth corresponding to the guiding vanes in stacks on top and on the bottom of the disks assembly, according to a preferred embodiment of the present invention.

FIG. 5 is a top view of a single disk 3 with the central opening defining the teeth 5 having the same shape as the guiding vanes from the cylindrical stacks. Again, in the wind turbine rotor assembly, the disks 3 are assembled one on top of the other with the pins 10 maintaining the required distance between the disks.

Figure 6:
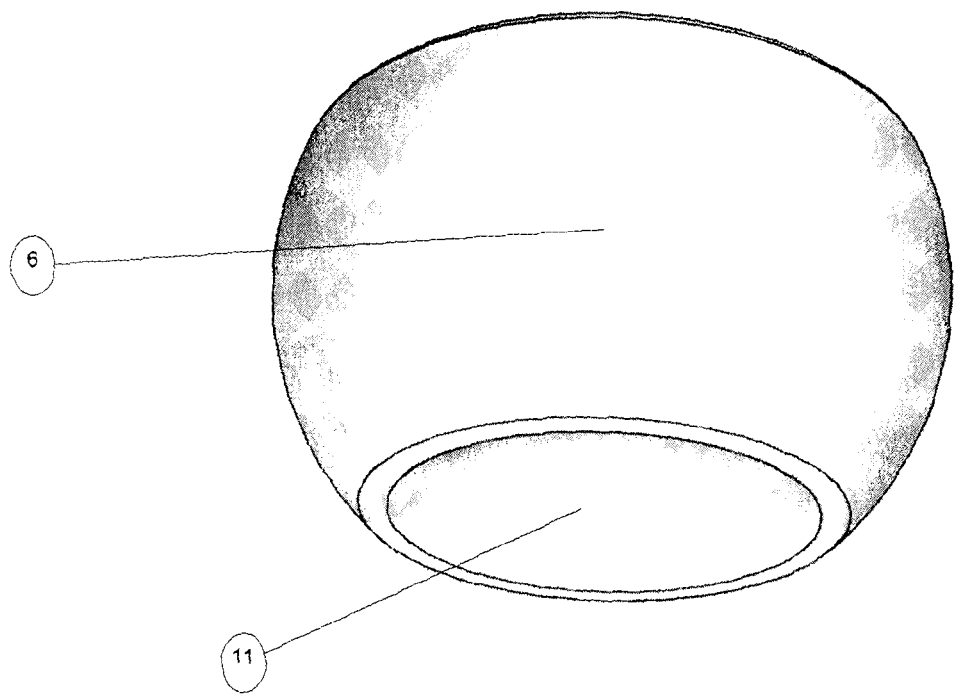
FIG. 6 is a perspective view of the end sphere.

FIG. 6 is a perspective view of the end sphere 6 with its central deflector 11. The deflector 11 will redirect the central portion of the vortex towards the opposite end of the hollow core where the air will be exhausted.

Figure 7:
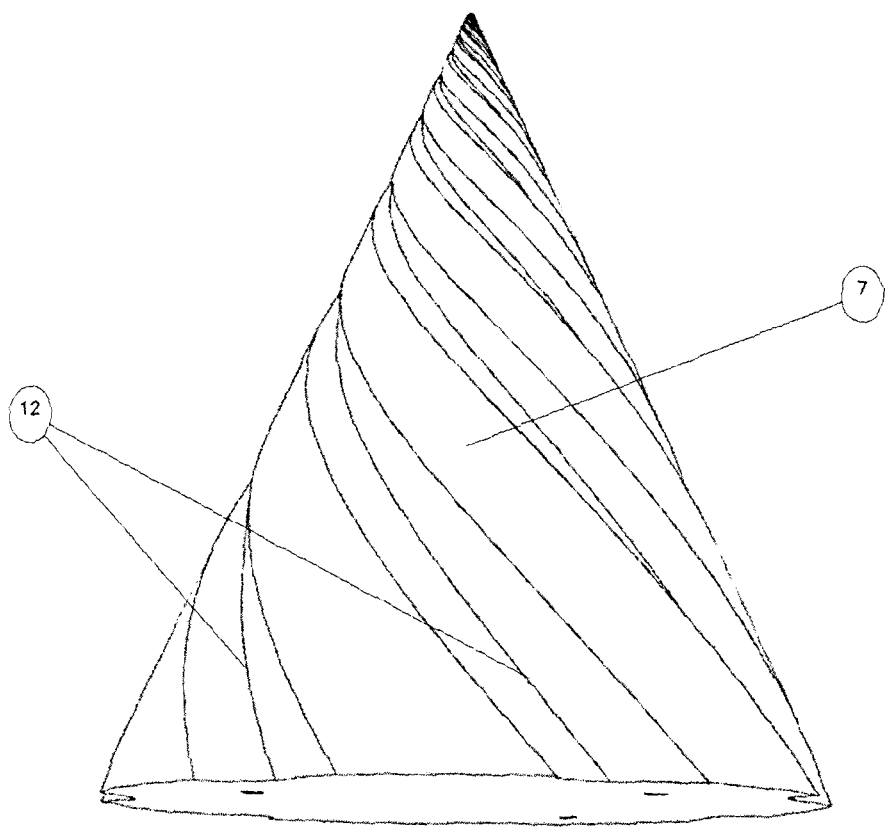
FIG. 7 is a perspective view of the end threaded cone.

FIG. 7 is a perspective view of the end cone 7 having a plurality of helical threads 12. The helical directions of the threads are according to the preferred embodiment where the vortex turns in anti-clockwise direction.

Figure 8:
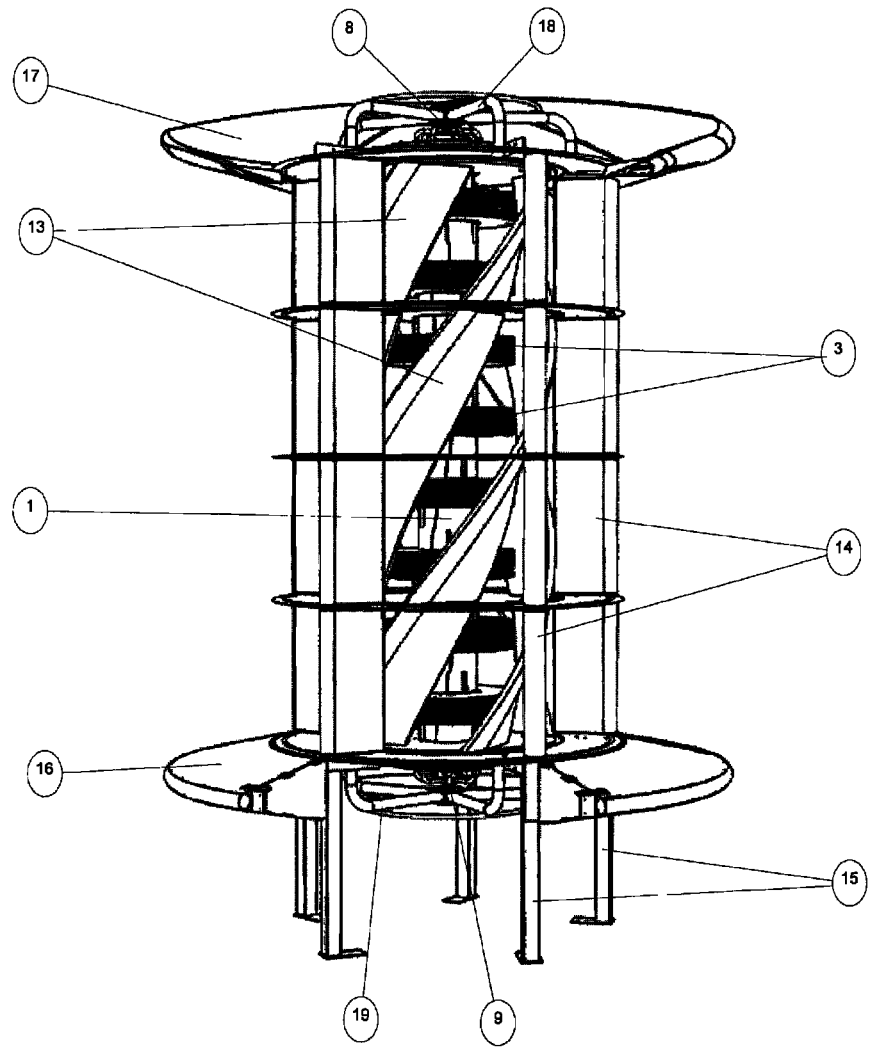
FIG. 8 is a perspective view of a vertical axis wind turbine assembly with the hollow rotor core, according to a preferred embodiment of the present invention.

FIG. 8 is a perspective view of a vertical axis wind turbine assembly with the hollow rotor core with the cylindrical stacks 1 and the disks assemblies 3 in conjunction with the preferred embodiment of the boundary layer wind turbine as disclosed in the International Patent Application No. PCT/CA2007/001200 attributed to the applicant. The turbine rotor is provided with blades 13 around the hollow rotor core. Around the rotor, the turbine further has a stator defined by stator blades 14, a bottom skirt 16 and a top cover 17. The rotor structure is sustained by a top frame structure 18 and by a bottom frame structure 19 which are attached to the stator structure. The top frame structure 18 has a bearing (not shown) where the top shaft frame 8 is inserted. The bottom frame structure 19 has a bearing (not shown) where the bottom shaft frame 9 is inserted. The whole wind turbine structure is supported by a plurality of legs 15. The wind turbine structure is raised via the legs 15 to allow the vortex to exhaust freely from the hollow rotor core. The bottom skirt 16 is used to deflect the incoming frontal wind in order not to interfere with the exhaust of the vortex from the hollow rotor core.

Although the hollow rotor core may be equipped with any number of cylindrical stacks and any number of air openings, in a preferred embodiment all the cylindrical stacks will cover 50% of the hollow rotor core height.

In a preferred embodiment, the hollow rotor core is designed in conjunction with the boundary layer wind turbine as disclosed in the International Patent Application No. PCT/CA2007/001200 attributed to the applicant.

The hollow rotor core is preferably made from a light non-corrosive material, preferably a light polymer to create a cost effective alternate power source.

Although the above description relates to a specific preferred embodiment as presently contemplated by the inventor, it will be understood that the invention in its broad aspect includes mechanical and functional equivalents of the elements described herein.

Without limiting the possibilities of alternate embodiments, there is described below some of such functional equivalents of the wind turbine hollow rotor core.

In alternate embodiments of the invention:
the hollow rotor core may be placed in a horizontal axis position. Such embodiment may be used in places where the wind is known to have only one direction or it may be used in a configuration where the turbine is placed on objects in motion (such as cars, boats, etc.) to generate the required electrical power;
the central opening and the guiding vanes may have any shape instead of the shapes described in the drawings;
the rotor may be designed in a full shaft configuration where the shaft traverse the hollow rotor core from top to bottom. It is understood that in this configuration the vortex will be affected by the presence of the shaft and a corresponding reduction in efficiency should be expected.

Theoretical Considerations

The energy in the wind has two components:
the kinetic energy
the heat energy

The current wind technologies are able to extract only a fraction of the kinetic energy. The maximum theoretical value of kinetic energy extraction from the wind was demonstrated in 1919 by Albert Betz and it is known as Betz's Law.

According to Betz Law, the maximum coefficient of performance (Cp) in wind kinetic energy extraction is 59.3%, which is known as the Betz Limit. The current wind technologies have in reality a much lower Cp than the Betz Limit.

Assuming that there is an ideal wind turbine able to extract the wind kinetic energy at a Cp of 59.3%, according to Betz limit, that the above ideal turbine has a frontal surface area of 100 square meters (10 m×10 m) and that the wind speed is 10 m/s and the exterior temperature is 15 degrees Celsius, the energy extracted by such an ideal wind turbine is:

$$E=0.5*\text{air\_density}*\text{frontal\_surface\_area}*\text{cubic\_power\_of\_wind\_speed}*Cp$$

$$E=0.5*1.225*100*1000*0.593$$

E=36,321.25 Watts=36.32125 kW

In terms of power production, over 1 hour of functioning in these conditions the turbine will produce:
Pkinetic=36.32125 kWh Assuming now that to the above ideal turbine will be integrated the assembly of the current invention with the hollow rotor core being able to extract a portion of the thermal energy in addition to the above calculated kinetic energy and that the proportion between the height of the cylindrical stacks 1 and the height of the assembled disks 3 between two cylindrical stacks 1 is 1:1, it is fair to assume that only 50% of the frontal airflow will go into the vortex.

Assuming that 90% of the vortex airflow will exit at a 0.1 degree Celsius lower temperature at the bottom of the hollow core and that 10% of the vortex airflow will exit at a 0.1 degree Celsius higher temperature at the top of the hollow core, the thermal power calculation is:

$$P\text{thermal\_bottom}=\text{air\_density}*\text{air\_volume\_exhaust\_per\_hour}*\text{temperature\_difference}*\text{air\_specific\_heat}$$

$$P\text{thermal\_bottom}=1.225*(100\ m^2*10\ m/s*3600\ s*90\%*50\%)*0.1*1.005\ kj/kg$$

Pthermal_bottom=199,442.25 kj

Knowing that 1 kilojoule (kj)=0.00027777777778 kWh we obtain:
Pthermal_bottom=55.4 kWh Via the same calculation taking into consideration that only 10% of the vortex airflow will exit at a 0.1 degree Celsius higher temperature at the top of the hollow core, we get:
Pthermal_top=6.15 kWh The difference between the Pthermal_bottom and the Pthermal_top was imparted to the wind turbine rotor in kinetic energy:
Pthermal=49.25 kWh Consequently the turbine in the above theoretical example having integrated the current invention will be able to produce a total of:

$$P\text{total}=P\text{kinetic}+P\text{thermal}=85.57\ kWh,\ \text{which is 2.35 times more than the Betz Limit in power extraction from kinetic energy.}$$

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. A hollow rotor core assembly for a wind turbine, comprising:
a hollow rotor core having a first end defining a first aperture and a second end defining a second aperture, the hollow rotor core comprising at least one set of cylindrical stacks, each cylindrical stack having a plurality of guiding vanes on an internal surface thereof;
a plurality of air openings formed on the cylindrical stacks and adapted to accept an airflow into the hollow rotor core for creating a vortex inside the hollow rotor core upon rotation of the hollow rotor core assembly, wherein the plurality of guiding vanes maintain the vortex within the hollow rotor core; and
an airflow blocking device mounted to the first end of the hollow rotor core, the blocking device having a surface over the first aperture of the first end partially blocking the first aperture of the first end to allow an exhaust of a fraction of a peripheral portion of the vortex through the first end of the hollow rotor core and to redirect a remaining central portion of the vortex towards the second end of the hollow rotor core for exhaustion of the remaining central portion of the vortex from the hollow rotor core through the second end.

2. The hollow rotor core assembly according to claim 1, wherein the hollow rotor core is adapted to rotate about a vertical axis.

3. The hollow rotor core assembly according to claim 1, wherein the hollow rotor is adapted to rotate about a horizontal axis.

4. The hollow rotor core assembly according to claim 1, wherein the plurality of guiding vanes form a helical shape to guide, upon rotation of the hollow rotor core, the remaining central portion of the vortex towards the second end of the hollow rotor core.

5. The hollow rotor core assembly according to claim 1, wherein the blocking device has a spherical shape with a concave central deflector for redirecting the remaining central portion of the vortex towards the second end.

6. The hollow rotor core assembly according to claim 1, wherein the blocking device rotates synchronously with the hollow rotor core.

7. The hollow rotor core assembly according to claim 6, wherein a frame is attached to the blocking device at the first end, the frame containing a shaft mountably connected to the rotor of the wind turbine.

8. The hollow rotor core assembly according to claim 1, wherein the blocking device is mounted to the hollow rotor core in close vicinity with the plurality of guiding vanes.

9. The hollow rotor core assembly according to claim 1, wherein the hollow rotor core is provided at the second end with a conical rotating device having a plurality of helical threads adapted to boost, upon rotation of the hollow rotor core, a rapid exhaust of the remaining central portion of the vortex.

10. The hollow rotor core assembly according to claim 9, wherein the threaded conical rotating device is connected to the hollow rotor core via a gearing device, the gearing device rotating the threaded conical rotating device faster than the hollow rotor core.

11. The hollow rotor core assembly according to claim 9, wherein a frame is attached at the second end, the frame containing a shaft mountably connected to the rotor of the wind turbine, and further wherein the conical rotating device is attached to the frame.

12. The hollow rotor core assembly according to claim 9, wherein a frame is attached at the second end, the frame containing a shaft mountably connected to the rotor of the wind turbine.

13. The hollow rotor core assembly according to claim 1, wherein the airflow accepted by the air openings enters into the hollow rotor core tangentially or in close vicinity to a peripheral internal surface of the hollow rotor core.

14. The hollow rotor core assembly according to claim 1, wherein the hollow rotor core is attached to a rotor of a wind turbine, the rotor of the wind turbine redirecting at least a portion of the airflow towards the air openings of the hollow rotor core.

15. The hollow rotor core assembly according to claim 14, wherein a frame is attached at the second end, the frame containing a shaft mountably connected to the rotor of the wind turbine.

16. The hollow rotor core assembly according to claim 14, wherein the rotor of the wind turbine is attached via a shaft to an electrical generator.

17. The hollow rotor core assembly according to claim 1, wherein each cylindrical stack is adapted to be assembled to a corresponding adjacent cylindrical stack and further wherein the set of cylindrical stacks comprises a pair of assembled adjacent cylindrical stacks.

18. The hollow rotor core assembly according to claim 1, wherein each cylindrical stack comprises a plurality of stacked disks and further wherein the air openings are formed by a spacing between adjacent ones of the stacked disks.

19. The hollow rotor core assembly according to claim 18, wherein each cylindrical stack further comprises a plurality of pins for maintaining the spacing between the adjacent stacked disks.

* * * * *